United States Patent
Kamiya

(10) Patent No.: US 11,483,487 B2
(45) Date of Patent: Oct. 25, 2022

(54) EVALUATION DEVICE, EVALUATION METHOD, AND CAMERA SYSTEM

(71) Applicant: SONY CORPORATION, Tokyo (JP)

(72) Inventor: Koji Kamiya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/989,527

(22) Filed: Aug. 10, 2020

(65) Prior Publication Data
US 2020/0374444 A1    Nov. 26, 2020

Related U.S. Application Data

(63) Continuation of application No. 16/077,531, filed as application No. PCT/JP2017/007559 on Feb. 27, 2017, now Pat. No. 10,771,709.

(30) Foreign Application Priority Data

Mar. 4, 2016   (JP) ................. 2016-042866

(51) Int. Cl.
*H04N 5/232*       (2006.01)
*H04N 5/235*       (2006.01)
(Continued)

(52) U.S. Cl.
CPC ............. *H04N 5/2351* (2013.01); *H04N 5/20* (2013.01); *H04N 5/232939* (2018.08); *H04N 17/002* (2013.01); *H04N 5/2355* (2013.01)

(58) Field of Classification Search
CPC ...... H04N 5/2351; H04N 5/20; H04N 17/002; H04N 5/232939; H04N 5/2355
See application file for complete search history.

(56) References Cited

U.S. PATENT DOCUMENTS

2006/0250515 A1    11/2006  Koseki et al.
2010/0045824 A1*    2/2010  Kido ............... H04N 5/243
                                             348/234
(Continued)

FOREIGN PATENT DOCUMENTS

JP          4-280584 A     10/1992
JP        2000-92378 A      3/2000
(Continued)

OTHER PUBLICATIONS

International Search Report dated May 23, 2017 in PCT/JP2017/007559 (2 pages).
(Continued)

*Primary Examiner* — Yogesh K Aggarwal
(74) *Attorney, Agent, or Firm* — Oblon, McClelland, Maier & Neustadt, L.L.P.

(57) ABSTRACT

It is made such that a user can easily and appropriately evaluate luminance of an HDR video signal.
A luminance evaluation value is obtained by processing the HDR video signal. The luminance evaluation value is displayed on a display unit. For example, the HDR video signal is a linear HDR video signal and/or the HDR video signal obtained by performing gradation compression on the linear HDR video signal with a log curve characteristic. For example, the luminance evaluation value includes an average picture level, a high light share ratio, a high light average picture level, a product value of the high light share ratio and the high light average picture level and the like.

15 Claims, 7 Drawing Sheets

(51) Int. Cl.
*H04N 5/20* (2006.01)
*H04N 17/00* (2006.01)

(56) References Cited

U.S. PATENT DOCUMENTS

| | | |
|---|---|---|
| 2012/0314124 A1 | 12/2012 | Kaizu et al. |
| 2013/0091430 A1 | 4/2013 | Zhai et al. |
| 2014/0063330 A1 | 3/2014 | Matuama et al. |
| 2014/0210847 A1 | 7/2014 | Knibbeler et al. |
| 2014/0225941 A1 | 8/2014 | Van der Vleuten et al. |
| 2015/0117791 A1 | 4/2015 | Mertens |
| 2015/0201222 A1 | 7/2015 | Mertens |
| 2017/0085833 A1 | 3/2017 | Toma et al. |
| 2017/0127069 A1 | 5/2017 | Mertens |
| 2017/0208344 A1 | 7/2017 | Mertens |
| 2017/0237907 A1 | 8/2017 | Toma et al. |
| 2017/0237959 A1 | 8/2017 | Toma et al. |
| 2017/0251167 A1 | 8/2017 | Toma et al. |
| 2017/0251168 A1 | 8/2017 | Toma et al. |

FOREIGN PATENT DOCUMENTS

| | | |
|---|---|---|
| JP | 2003-125240 A | 4/2003 |
| JP | 2006-295814 A | 10/2006 |
| JP | 2007-266680 A | 10/2007 |
| JP | 2010-50737 A | 3/2010 |
| JP | 2012-44480 A | 3/2012 |
| WO | WO 2015/190045 A1 | 12/2015 |

OTHER PUBLICATIONS

Office Action dated Jul. 3, 2018 in Japanese Patent Application No. 2016-042866 (13 pages).
Extended European Search Report dated Jan. 29, 2019 in corresponding European Patent Application No. 17759937.0, (113 pages).
Japanese Office Action dated Nov. 26, 2019 in Japanese Patent Application No. 2018-188590, (8 pages).

\* cited by examiner

EVALUATION DEVICE, EVALUATION METHOD, AND CAMERA SYSTEM

CROSS-REFERENCE TO RELATED APPLICATIONS

This application is a continuation of U.S. Ser. No. 16/077,531, filed on Aug. 13, 2018, which is incorporated herein by reference. U.S. Ser. No. 16/077,531 is a National Stage of PCT/JP2017/007559, filed on Feb. 27, 2017, and claims the benefit of priority under 35 U.S.C. § 119 of Japanese Application No. 2016-042866, filed Mar. 4, 2016.

TECHNICAL FIELD

The present technology relates to an evaluation device, an evaluation method, and a camera system, and specifically relates to a luminance evaluation device and the like for evaluating luminance of a high dynamic range video signal.

BACKGROUND ART

A video signal of a high dynamic range (HDR) has a luminance level range from 0% to 100%*N (N is a number larger than one) with respect to a video signal of a standard dynamic range (SDR) having a luminance level range from 0% to 100%. A camera which outputs an HDR video signal as a captured video signal is conventionally known (refer to, for example, Patent Document 1).

In general operation, a video engineer (VE) manually adjusts an iris of a camera (Iris) while monitoring a monitor and a waveform monitor. However, in a case of the HDR video signal, there is a margin in an upper limit, so that it is difficult to set a reference for keeping a luminance level constant, and it is difficult to appropriately adjust a luminance level only by human sense while being affected by a surrounding environment and the like. In broadcasting, it is necessary to adjust the luminance so that a viewer does not feel uncomfortable taking connection of cuts, compatibility, and the like of programs into consideration.

CITATION LIST

Patent Document

Patent Document 1: Japanese Patent Application Laid-Open No. 2015-115789

SUMMARY OF THE INVENTION

Problems to be Solved by the Invention

An object of the present technology is to enable a user to easily and appropriately evaluate luminance of an HDR video signal.

Solutions to Problems

The concept of the present technology is
an evaluation device provided with:
a processing unit which calculates a luminance evaluation value by processing a high dynamic range video signal; and
a control unit which displays the calculated luminance evaluation value on a display unit.
In the present technology, the processing unit calculates the luminance evaluation value by processing the high dynamic range video signal. Then, the control unit displays the luminance evaluation value calculated by the processing unit on the display unit.

For example, the processing unit may calculate an average value of luminance for an entire screen as the luminance evaluation value using a linear high dynamic range video signal.

Also, for example, this may calculate an average value of luminance for an entire screen as the luminance evaluation value using the high dynamic range video signal subjected to gradation compression processing. In this case, for example, the processing unit may calculate the average value of the luminance for the entire screen as a ratio obtained by setting a code value corresponding to luminance of 100% as a reference value. Also, in this case, for example, the processing unit may calculate the average value of the luminance for the entire screen as a converted value to a luminance value before the compression processing is performed.

Also, for example, the processing unit may calculate a proportion of an area of a certain luminance level or higher in an entire screen as the luminance evaluation value using a linear high dynamic range video signal or the high dynamic range video signal subjected to gradation compression processing.

Also, for example, the processing unit may calculate an average value of luminance for an area of a certain luminance level or higher as the luminance evaluation value using a linear high dynamic range video signal. Also, for example, the processing unit may calculate an average value of luminance for an area of a certain luminance level or higher as the luminance evaluation value using the high dynamic range video signal subjected to gradation compression processing.

Also, for example, the processing unit may calculate a product value of a proportion of an area of a certain luminance level or higher in an entire screen and an average value of luminance for the area as the luminance evaluation value using a linear high dynamic range video signal. Also, for example, the processing unit may calculate a product value of a proportion of an area of a certain luminance level or higher in an entire screen and an average value of luminance for the area as the luminance evaluation value using the high dynamic range video signal subjected to gradation compression processing.

Also, another concept of the present technology is
a camera system provided with:
an imaging unit which obtains a linear high dynamic range video signal;
a processing unit which calculates a luminance evaluation value by processing the linear high dynamic range video signal obtained by the imaging unit and/or a high dynamic range video signal obtained by applying gradation compression processing to the linear high dynamic range video signal; and
a control unit which displays the calculated luminance evaluation value on a display unit.

In the present technology, the linear high dynamic range video signal is obtained by the imaging unit. The processing unit processes the linear high dynamic range video signal and/or the high dynamic range video signal obtained by applying the gradation compression processing to the linear high dynamic range video signal to calculate the luminance evaluation value. The luminance evaluation value is displayed on the display unit by the control unit.

Effects of the Invention

According to the present technology, a user may easily and appropriately evaluate luminance of an HDR video signal. Meanwhile, the effect described in this specification is illustrative only; the effect is not limited thereto and there may also be an additional effect.

MODE FOR CARRYING OUT THE INVENTION

A mode for carrying out the invention (hereinafter referred to as an "embodiment") is hereinafter described. Meanwhile, it is described in the following order.
1. First Embodiment
2. Second Embodiment
3. Variation 1. First Embodiment

[Configuration Example of Camera System]

Figure 1:
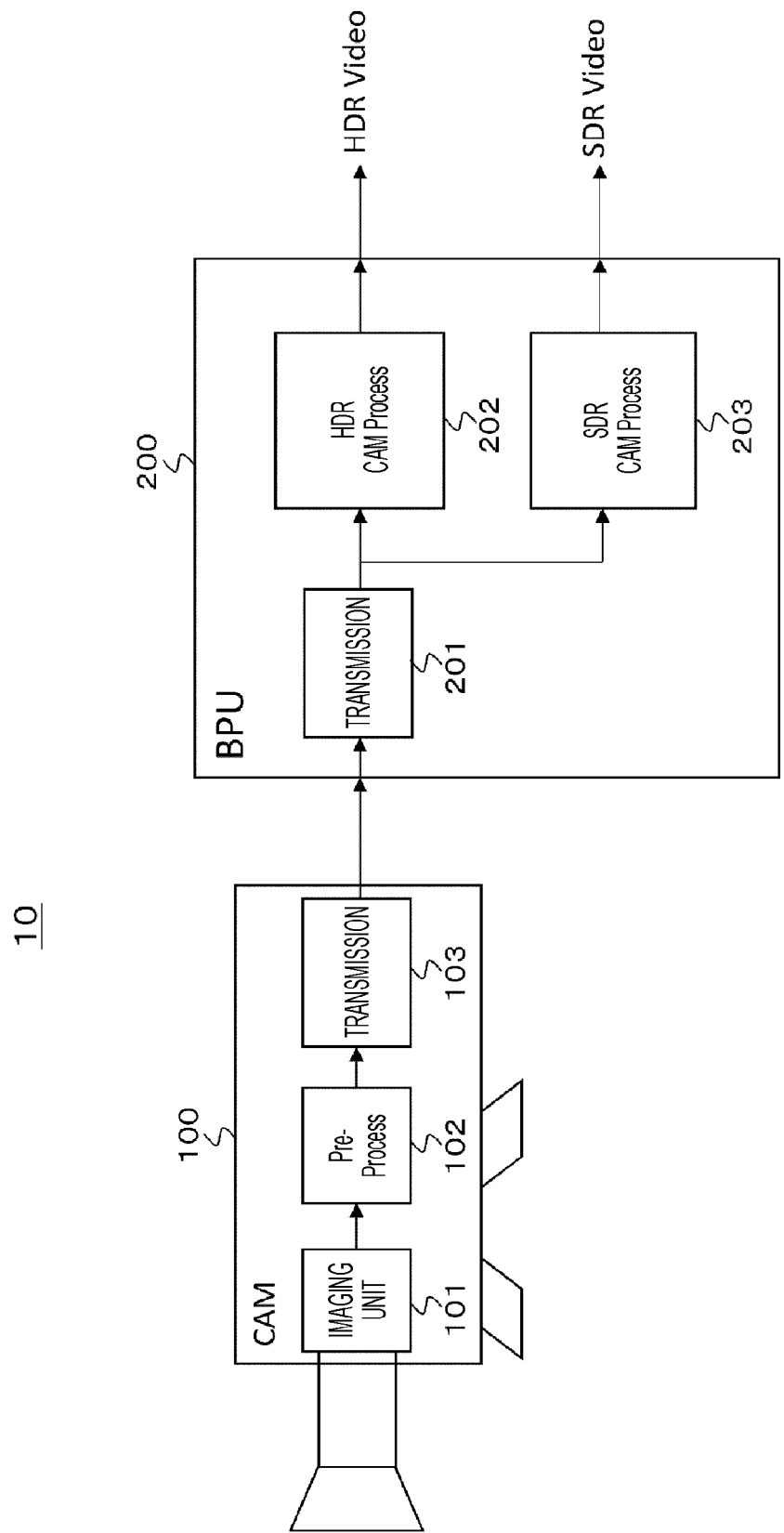
FIG. 1 is a block diagram illustrating a configuration example of a camera system as a first embodiment.

FIG. 1 illustrates a configuration example of a camera system 10 as an embodiment. The camera system 10 is configured such that a linear high dynamic range (HDR) video signal as a captured video signal obtained by a camera 100 is transmitted to a baseband processor unit (BPU) 200 as a signal processing unit. Herein, "linear" means that gradation compression processing is not performed.

The camera 100 includes an imaging unit 101, a pre-process unit 102, and a transmission unit 103. The imaging unit 101 includes, for example, an image sensor with 4K or HD resolution, and outputs an HDR video signal as the captured video signal. The pre-process unit 102 is a processor formed of a circuit such as FPGA and ASIC, for example, and performs correction processing of an optical system such as a lens, correction processing of a damage caused by variation in image sensors and the like on the HDR video signal output from the imaging unit 101, and the like. The transmission unit 103 is a circuit including a communication interface and transmits the HDR video signal processed by the pre-process unit 102 to the BPU 200.

The BPU 200 includes a transmission unit 201, an HDR camera process (HDR CAM Process) unit 202, and an SDR camera process (SDR CAM Process) unit 203. The transmission unit 201 is a circuit including a communication interface and receives the linear HDR video signal transmitted from the camera 100. The HDR camera process unit 202 is a processor formed of a circuit such as FPGA and ASIC, for example, and performs processing such as color gamut conversion, detail (contour) correction, and gradation compression on the linear HDR video signal received by the transmission unit 201 to obtain an output HDR video signal (HDR Video). The gradation compression processing herein means the gradation compression processing in which a bit length is compressed from a linear region by using an optical-electro transfer function (OETF) for HDR. The SDR camera process unit 203 is a processor formed of a circuit such as FPGA and ASIC, for example, and performs processing such as color gamut conversion, knee correction, detail (contour) correction, and gradation compression on the linear HDR video signal received by the transmission unit 201 to obtain an output SDR video signal (SDR Video). The gradation compression processing herein means the gradation compression processing in which the bit length is compressed from the linear region by using the optical-electro transfer function (for example, a gamma characteristic) for SDR.

In this embodiment, the BPU 200 processes the HDR video signal and calculates a luminance evaluation value to display on a display unit. The luminance evaluation value includes, for example, following (1) to (7).

(1) An average picture level (APL) which is an average value of luminance for an entire screen calculated using the linear HDR video signal (HDR video signal before gradation compression processing).

(2) A visual average picture level (V_APL) which is an average value of luminance for the entire screen calculated using the HDR video signal on which the gradation compression processing is performed (HDR video signal after gradation compression processing). The visual average picture level (V_APL) is obtained as a numerical value close to sense of brightness felt by human beings. Therefore, in this case, it is possible to obtain the average value of luminance for the entire screen as the numerical value close to the sense of brightness felt by human beings.

(3) A high light share ratio (HL_Ratio) which is a proportion of an area of a certain luminance level or higher of the entire screen calculated using the linear HDR video signal or the HDR video signal subjected to the gradation compression processing.

(4) A high light average picture level (HL_APL) which is an average value of luminance for an area of a certain luminance level or higher calculated using the linear HDR video signal.

(5) A high light visual average picture level (HL_V_APL) which is an average value of luminance for an area of a certain luminance level or higher calculated using the HDR video signal subjected to the gradation compression processing.

(6) A product value ([HL_ENG]) of the high light share ratio (HL_Ratio) and the high light average picture level (HL_APL) calculated using the linear HDR video signal.

(7) A product value (HL_BLT) of the high light share ratio (HL_Ratio) and the high light visual average picture level (HL_V_APL) calculated using the HDR video signal subjected to the gradation compression processing.

Figure 2:
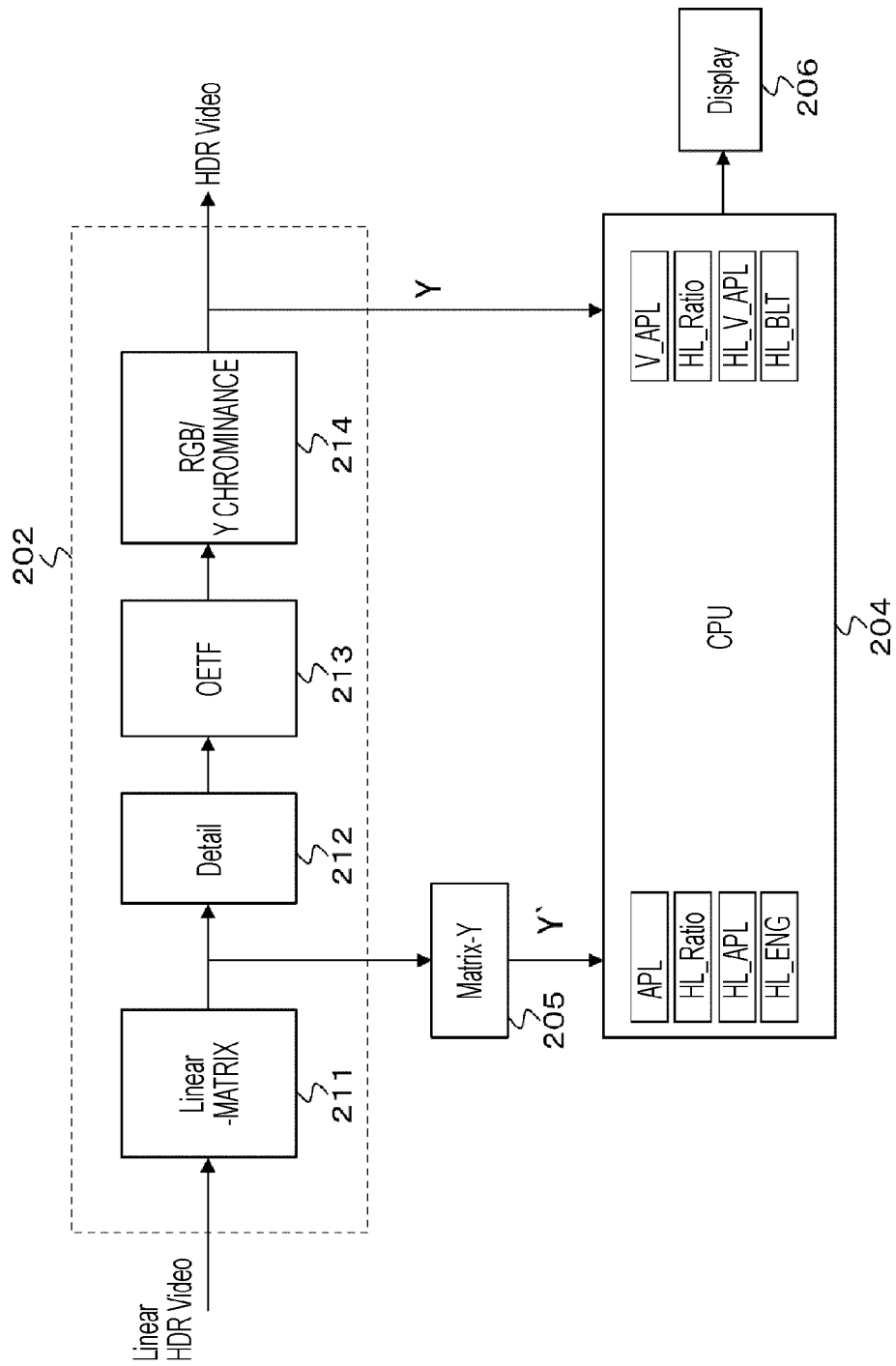
FIG. 2 is a block diagram illustrating a configuration example of a part relating to calculation and display of a luminance evaluation value in a BPU.

FIG. 2 illustrates a configuration example of a part related to calculation and display of the luminance evaluation value in the BPU 200. A CPU 204 controls each unit of the BPU 200 on the basis of a control program, and also forms a calculation unit and a display control unit of the luminance evaluation value.

The HDR camera process unit 202 includes a linear matrix unit 211, a detail unit 212, an optical-electro transfer function (OETF) unit 213, and an RGB/Y chrominance conversion unit 214. The linear matrix unit 211 performs color gamut conversion processing on the linear HDR video signal (Linear HDR Video) received by the transmission unit 201 (refer to FIG. 1). The detail unit 212 performs detail (contour) correction processing on the HDR video signal output from the linear matrix unit 211.

The OETF unit 213 performs the gradation compression processing, that is, the gradation compression processing of compressing the bit length from the linear region using the optical-electro transfer function for HDR on the HDR video signal output from the detail unit 212. Through this gradation compression processing, the HDR video signal is subjected to the gradation compression processing with a log curve characteristic. Herein, the log curve characteristic is intended to mean not only a logarithmic function itself but also a curve of a characteristic such that gradation of low band luminance is dense and gradation of high band luminance is sparse, and there is, for example, a hybrid log-gamma (HLG) curve characteristic, a perceptual quantizer (PQ) curve characteristic, an S-LOG 3 characteristic and the like. The RGB/Y chrominance conversion unit 214 converts the HDR video signal output from the OETF unit 213 from an RGB domain to a Y chrominance domain to obtain the output HDR video signal (HDR Video).

A matrix Y (Matrix-Y) unit 205 performs matrix processing on the HDR video signal (RGB domain) output from the linear matrix unit 211 to obtain a luminance signal Y'. Using the luminance signal Y' obtained by the matrix Y unit 205, the CPU 204 calculates the average picture level (APL), the high light share ratio (HL_Ratio), the high light average picture level (HL_APL), and the product value (HL_ENG) as the above-described luminance evaluation values.

In this case, the CPU 204 calculates the average picture level (APL) on the basis of following equation (1). Herein, "$\Sigma(Y'i)$" represents the sum of luminance signals (pixel signals) of the pixels of the entire screen. For example, the % notation of a dynamic range is used as a notation unit of the average picture level (APL). Meanwhile, the % notation of the dynamic range means the notation by % numerical value when a luminance range of SDR is 0% to 100%.

$$APL=\Sigma(Y'i)/\text{number of pixels in entire screen} \quad (1)$$

Also, in this case, the CPU 204 calculates the high light share ratio (HL_Ratio) on the basis of following equation (2). Herein, "COUNT[Y'≥a]" represents the number of pixels of the luminance level of "a" or higher among the pixels of the entire screen.

$$HL\_Ratio=COUNT[Y'\geq a]/\text{number of pixels of entire screen} \quad (2)$$

Also, in this case, the CPU 204 calculates the high light average picture level (HL_APL) on the basis of following equation (3). Herein, "$\Sigma(Y'HL)$" represents the sum of luminance signals (pixel signals) of pixels of a luminance level of "a" or higher. For example, the % notation of the dynamic range is used as a notation unit of the high light average picture level (HL_APL).

$$HL\_APL=\Sigma(Y'HL)/COUNT[Y'\geq a] \quad (3)$$

Also, in this case, the CPU 204 calculates the product value (HL_ENG) on the basis of following equation (4).

$$HL\_ENG=[HL\_Ratio]*[HL\_APL] \quad (4)$$

In addition, the CPU 204 calculates the visual average picture level (V_APL), the high light share ratio (HL_Ratio), the high light visual average picture level (HL_V_APL), and the product value (HL_BLT) as the luminance evaluation values described above using a luminance signal Y (10-bit/12-bit code) included in the HDR video signal (Y chrominance domain) output from the RGB/Y chrominance conversion unit 214.

In this case, the CPU 204 calculates the visual average picture level (V_APL) on the basis of following equation (5). Herein, "$\Sigma(Yi)$" represents the sum of luminance signals (pixel signals) of the pixels of the entire screen.

$$V\_APL=\Sigma(Yi)/\text{number of pixels of entire screen} \quad (5)$$

The notation unit of the visual average picture level (V_APL) is, for example, a ratio obtained by setting a code value corresponding to the luminance of 100% as a reference code value. In this case, the CPU 204 calculates the ratio on the basis of following equation (6).

$$V\_APL=f\{[V\_APL]-[\text{black code value}]\}/[\text{reference code value}] \quad (6)$$

For example, in a case where the log curve characteristic is the HLG characteristic, the code value corresponding to the luminance of 100% is [1F6h], the black code value which is the code value corresponding to the luminance of 0% is [040h], and the reference code value is [1F6h-040h]. Also, for example, in a case where the log curve characteristic is the PQ curve characteristic, the code value corresponding to the luminance of 100% is [1FDh], the black code value which is the code value corresponding to the luminance of 0% is [040h], and the reference code value is [1FDh-040h]. Also, for example, in a case where the log curve characteristic is the S-LOG 3 characteristic, the code value corresponding to the luminance of 100% is [256h], the black code value which is the code value corresponding to the luminance of 0% is [05Fh], and the reference code value is [256h-05Fh].

Also, for example, the % notation of the dynamic range is used as the notation unit of the visual average picture level (V_APL). In this case, the CPU 204 converts the code value of the visual average picture level (V_APL) into the luminance value before the gradation compression by performing inverse conversion of the conversion indicated by the characteristic on the basis of the log curve characteristic.

Also, in this case, the CPU 204 calculates the high light share ratio (HL_Ratio) on the basis of following equation (2). Herein, "COUNT [Y≥b]" represents the number of pixels having a code value of "b" or larger among the pixels of the entire screen.

$$HL\_Ratio=COUNT[Y\geq b]/\text{number of pixels of entire screen} \quad (7)$$

Meanwhile, in this case, in a case where the code value "b" is the code value corresponding to the luminance level "a", the high light share ratio (HL_Ratio) obtained by equation (7) is the same value as the high light share ratio (HL_Ratio) obtained by equation (2) described above. Therefore, in this case, the calculation of the high light share ratio (HL_Ratio) based on equation (7) can be omitted.

Also, in this case, the CPU 204 calculates the high light visual average picture level (HL_V_APL) on the basis of following equation (8). Herein, "$\Sigma(YHL)$" represents the sum of luminance signals (pixel signals) of pixels having a code value of "b" or larger.

$$HL\_V\_APL=\Sigma(YHL)/COUNT[Y\geq b] \quad (8)$$

The notation unit of this high light visual average picture level (HL_V_APL) is, for example, a ratio obtained by setting the code value corresponding to the luminance of 100% as a reference code value. In this case, the CPU 204 calculates the ratio on the basis of following equation (9). Although it is not herein described in detail, [black code value] and [reference code value] in equation (9) are the same as those in equation (6) described above and are appropriately changed according to the log curve characteristic.

$$\text{Ratio}=\{[HL\_V\_APL]-[\text{black code value}]\}/[\text{reference code value}] \quad (9)$$

Also, for example, the % notation of the dynamic range is used as the notation unit of the high light visual average picture level (HL_V_APL). In this case, the CPU 204 converts the code value of the high light visual average picture level (HL_V_APL) into the luminance value before the gradation compression by performing inverse conversion of the conversion indicated by the characteristic on the basis of the log curve characteristic.

Also, in this case, the CPU 204 calculates the product value (HL_BLT) on the basis of following equation (10).

$$HL\_BLT=[HL\_\text{Ratio}]*[HL\_V\_APL] \quad (10)$$

Then, the CPU 204 controls to display all or a part of the luminance evaluation values obtained as described above on the display 206 as the display unit. Meanwhile, the display 206 is not limited to the display of the BPU 200 but may be a display (display panel) provided outside the BPU 200.

Figure 3:
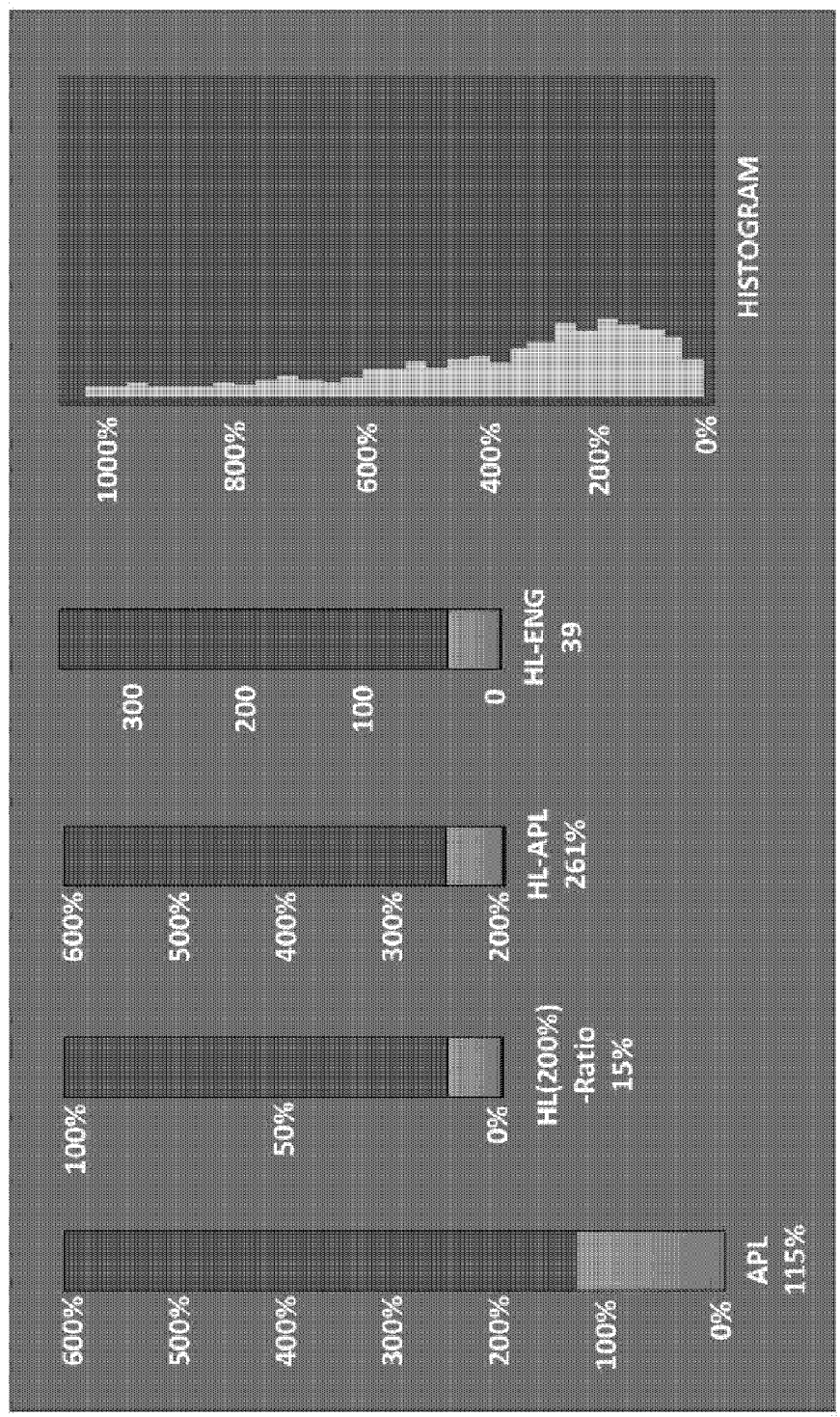
FIG. 3 is a view illustrating an example of the display of the luminance evaluation value on a display.

FIG. 3 illustrates an example of the display of the luminance evaluation values on the display 206. In this example, the average picture level (APL), the high light share ratio (HL_Ratio), the high light average picture level (HL_APL), and the product value (HL_ENG) are displayed by numerical values and bars, and the luminance of the pixels of the entire screen is displayed by histogram.

In this example, it is illustrated that the average picture level (APL) is 115%. Also, in this example, it is illustrated that the luminance level of 200% or higher is set as a high luminance area, the high light share ratio (HL_Ratio) is 15%, and the high light average picture level (HL_APL) is 261%. Also, in this example, a total light amount of the high luminance area is indicated as 39 by the display of the product value (HL_ENG).

Figure 4:
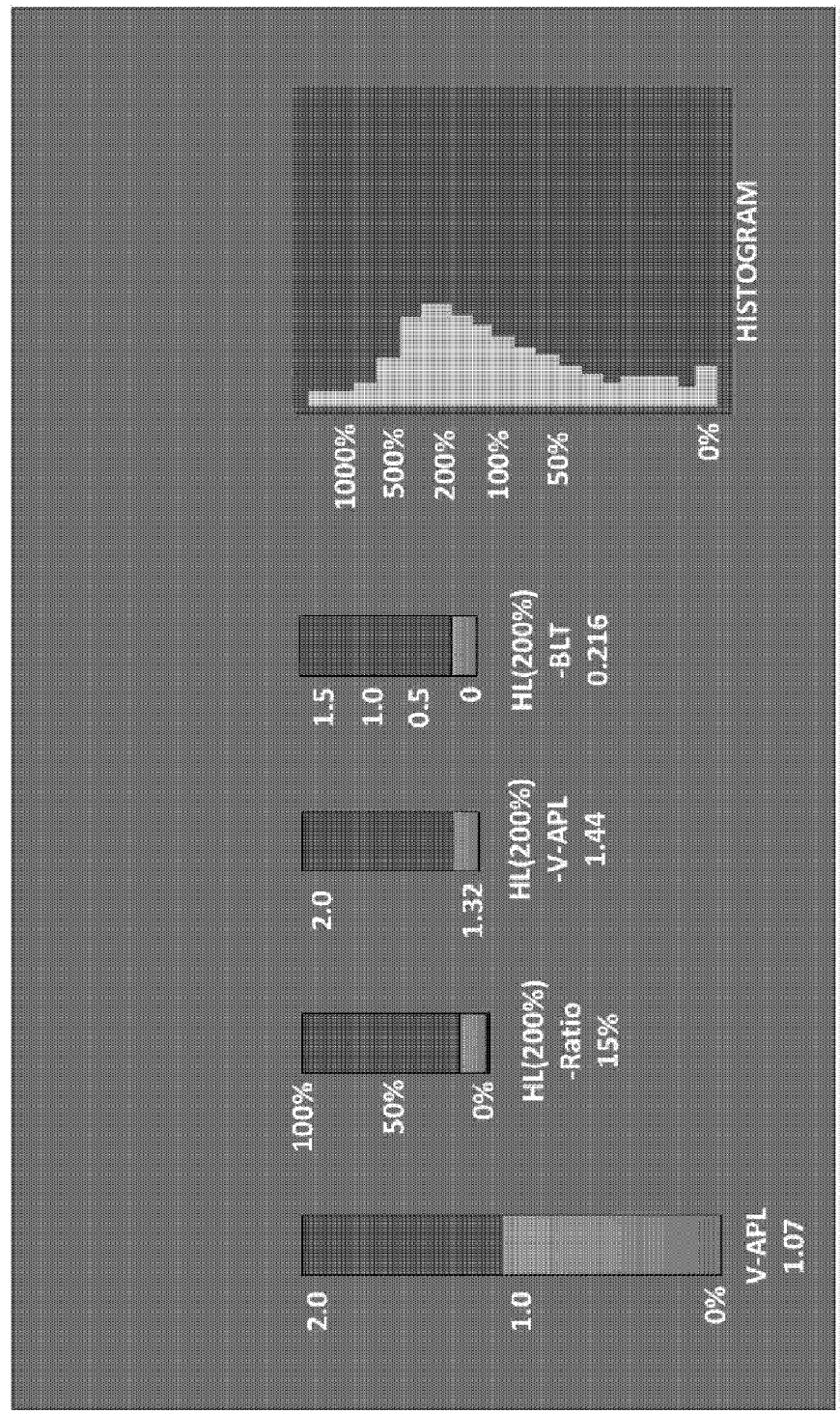
FIG. 4 is a view illustrating another example of the display of the luminance evaluation value on the display.

FIG. 4 illustrates another example of the display of the luminance evaluation value on the display 206. In this example, the visual average picture level (V_APL), the high light share ratio (HL_Ratio), the high light visual average picture level (HL_V_APL), and the product value (HL_BLT) are displayed as numerical values and bars, and the luminance of the pixels of the entire screen is displayed as histogram. In this example, the notation unit of the visual average picture level (V_APL) and the high light visual average picture level (HL_V_APL) is a ratio obtained by setting a code value corresponding to the luminance of 100% as a reference code value.

In this example, it is illustrated that the visual average picture level (V_APL) is 1.07 times. Also, in this example, it is illustrated that the luminance level of 200% or higher is set as the high luminance area, the high light share ratio (HL_Ratio) is 15%, and the high light visual average picture level (HL_V_APL) is 1.44 times. Also, in this example, the total light amount of the high luminance area is indicated as 0.216 by the display of the product value (HL_BLT).

Figure 5:
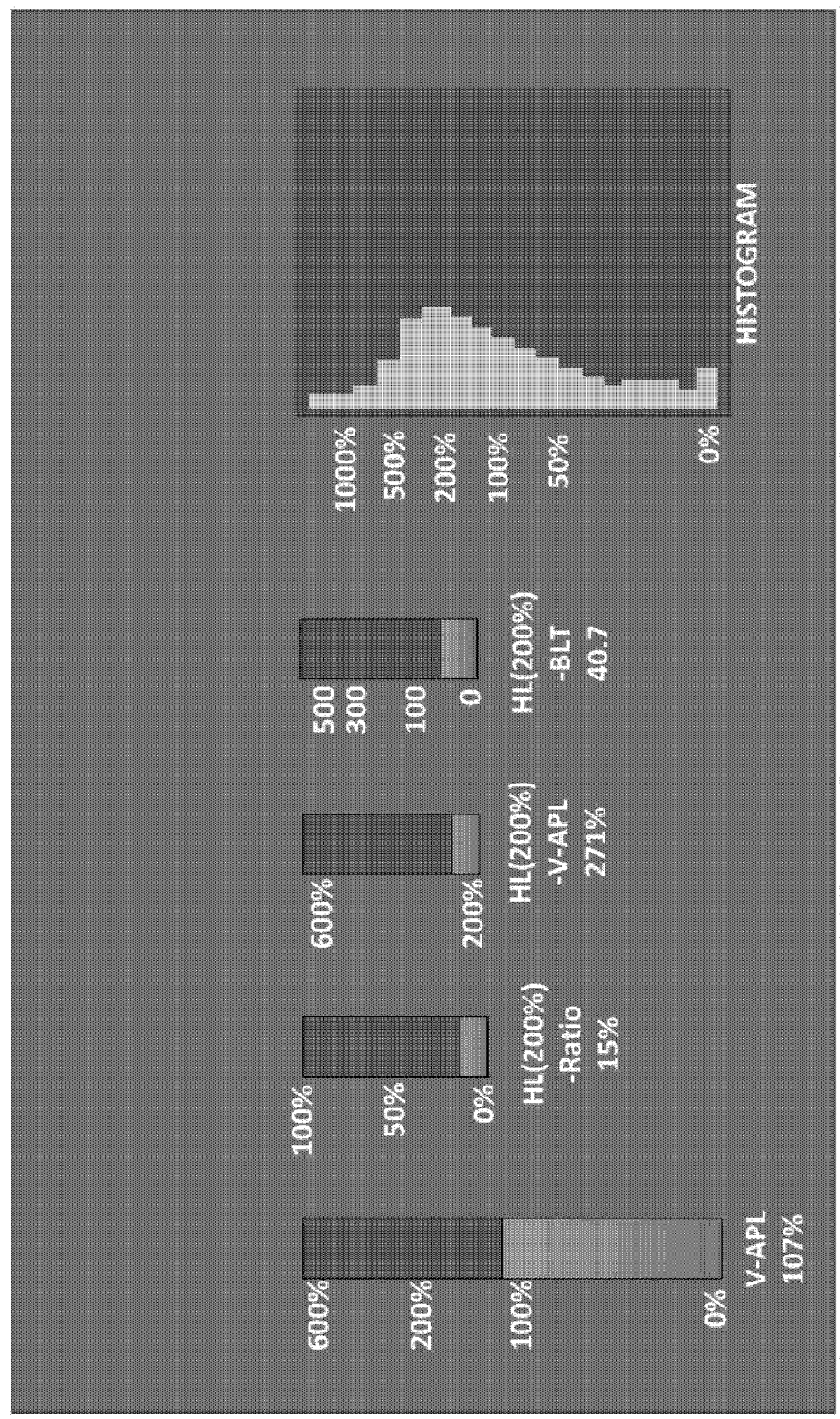
FIG. 5 is a view illustrating another example of the display of the luminance evaluation value on the display.

FIG. 5 illustrates another example of the display of the luminance evaluation value on the display 206. In this example, the visual average picture level (V_APL), the high light share ratio (HL_Ratio), the high light visual average picture level (HL_V_APL), and the product value (HL_BLT) are displayed as numerical values and bars, and the luminance of the pixels of the entire screen is displayed as histogram. In this example, the % notation of the dynamic range is used for the notation unit of the visual average picture level (V_APL) and the high light visual average picture level (HL_V_APL).

In this example, it is illustrated that the visual average picture level (V_APL) is 107%. Also, in this example, it is illustrated that the luminance level of 200% or higher is set as the high luminance area, the high light share ratio (HL_Ratio) is 15%, and the high light visual average picture level (HL_V_APL) is 271%. Also, in this example, the total light amount of the high luminance area is indicated as 40.7 by the display of the product value (HL_BLT).

As described above, in the camera system 10 illustrated in FIG. 1, the BPU 200 processes the HDR video signal to obtain the luminance evaluation value, and the luminance evaluation value is displayed on the display 206. Therefore, a user, for example, a VE can easily and appropriately evaluate the luminance of the HDR video signal on the basis of the luminance evaluation value displayed on the display 206. As a result, the VE can perform iris adjustment and the like of the camera 100 in an excellent manner.

Second Embodiment

[Configuration Example of Camera System]

In the first embodiment described above, an example is illustrated in which a linear HDR video signal is transmitted from a camera 100 to a BPU 200 and the BPU 200 calculates to display various luminance evaluation values under supply of the linear HDR video signal. However, even in a case where the HDR video signal already subjected to gradation compression processing is supplied, similar luminance evaluation can be calculated to be displayed.

Figure 6:
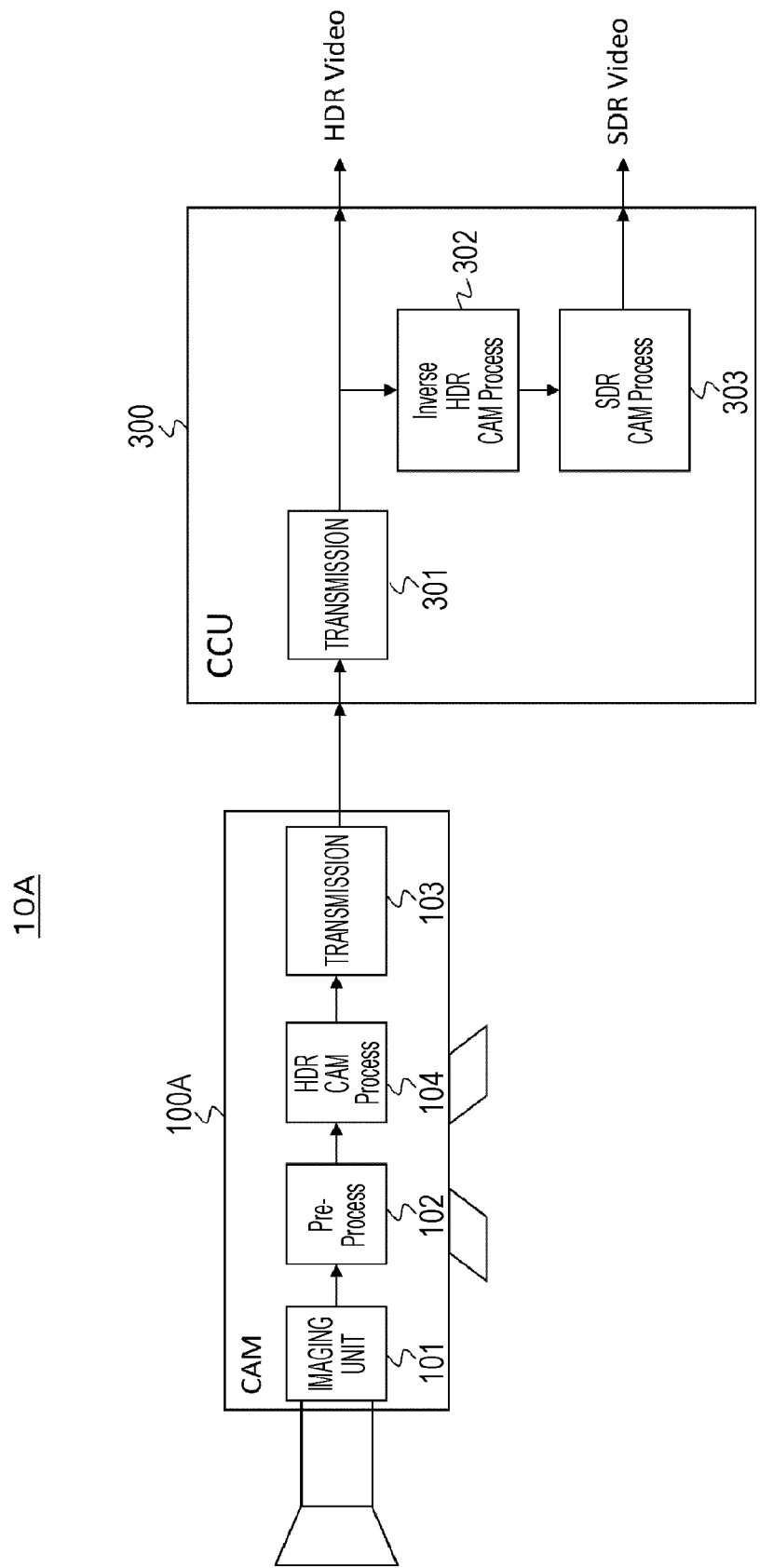
FIG. 6 is a block diagram illustrating a configuration example of a camera system as a second embodiment.

FIG. 6 illustrates a configuration example of a camera system 10A as a second embodiment. In FIG. 6, a part corresponding to that in FIG. 1 is assigned with the same reference sign, and the detailed description thereof is omitted as appropriate. The camera system 10A is configured such that the HDR video signal subjected to the gradation compression processing as a captured video signal obtained by a camera 100A is transmitted to a camera control unit (CCU) 300.

The camera 100A includes an imaging unit 101, a pre-process unit 102, an HDR camera process (HDR CAM Process) unit 104, and a transmission unit 103. The imaging unit 101 includes, for example, an image sensor with 4K or HD resolution, and outputs the HDR video signal as the captured video signal. The pre-process unit 102 is a processor formed of a circuit such as FPGA and ASIC, for example, and performs correction processing of an optical system such as a lens, correction processing of a damage caused by variation in image sensors and the like on the HDR video signal output from the imaging unit 101, and the like.

The HDR camera process unit 104 is a processor formed of a circuit such as FPGA and ASIC, for example, and performs processing such as color gamut conversion, detail (contour) correction, and gradation compression on the HDR video signal processed by the pre-process unit 102. Although not described in detail, the HDR camera process unit 104 has a configuration similar to that of an HDR camera process unit 202 in the BPU 200 of a camera system 10 described above (refer to FIGS. 1 and 2). The transmission unit 103 is a circuit including a communication interface and transmits the HDR video signal processed by the HDR camera process unit 104 to the CCU 300.

The CCU 300 includes a transmission unit 301, an inverse HDR camera process (Inverse HDR CAM Process) unit 302, and an SDR camera process (SDR CAM Process) unit 303. The transmission unit 301 is a circuit including a communication interface, and receives the HDR video signal transmitted from the camera 100A. This HDR video signal directly becomes an output HDR video signal from the CCU 300.

The inverse HDR camera process unit 302 is a processor formed of a circuit such as FPGA and ASIC, for example, and performs processing such as conversion from a Y chrominance domain to an RGB domain and inverted conversion of gradation compression on the HDR video signal received by the transmission unit 301 to obtain the linear HDR video signal. The SDR camera process unit 303 is a processor formed of a circuit such as FPGA and ASIC, for example, and performs processing such as color gamut conversion, knee correction, detail (contour) correction, and gradation compression on the linear HDR video signal received by the inverse HDR camera process unit 302 to obtain an output SDR video signal (SDR Video).

Figure 7:
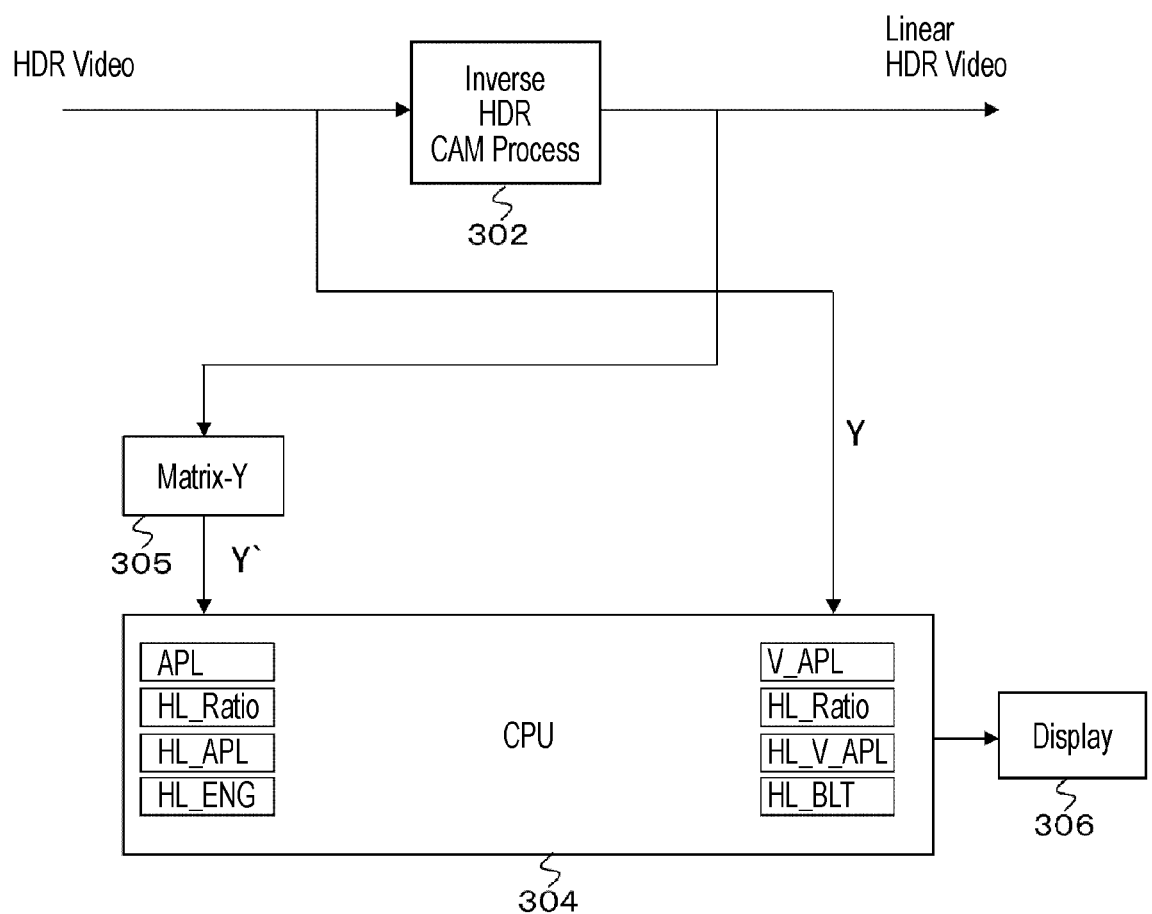
FIG. 7 is a block diagram illustrating a configuration example of a part relating to calculation and display of a luminance evaluation value in a CCU.

In this embodiment, the CCU 300 processes the HDR video signal and calculates the luminance evaluation value to display on a display unit. FIG. 7 illustrates a configuration example of a part related to calculation and display of the luminance evaluation value in the CCU 300. A CPU 304 controls each unit of the CCU 300 on the basis of a control program, and also forms a calculation unit and a display control unit of the luminance evaluation value.

A matrix Y (Matrix-Y) unit 305 performs matrix processing on the linear HDR video signal (RGB domain) output from the inverse HDR camera process unit 302 to obtain a luminance signal Y'. Using the luminance signal Y' obtained by the matrix Y unit 305, the CPU 304 calculates an average picture level (APL), a high light share ratio (HL_Ratio), a high light average picture level (HL_APL), and a product value (HL_ENG) as the above-described luminance evaluation values.

Also, the CPU 304 calculates a visual average picture level (V_APL), the high light share ratio (HL_Ratio), a high light visual average picture level (HL_V_APL), and a product value (HL_BLT) as the luminance evaluation values described above using a luminance signal Y (10-bit/12-bit code) included in the HDR video signal (Y chrominance domain) input to the inverse HDR camera process unit 302.

Then, the CPU 304 controls to display all or a part of the luminance evaluation values obtained as described above on a display 306 as the display unit (refer to FIGS. 3 to 5). Meanwhile, the display 306 is not limited to the display of the CCU 300 but may be a display (display panel) provided outside the CCU 300.

As described above, in the camera system 10A illustrated in FIG. 6, the CCU 300 processes the HDR video signal to obtain the luminance evaluation value, and the luminance evaluation value is displayed on the display 306. Therefore, a user, for example, a VE can easily and appropriately evaluate the luminance of the HDR video signal on the basis of the luminance evaluation value displayed on the display 306. As a result, the VE can perform iris adjustment and the like of the camera 100A in an excellent manner.

3. Variation

Meanwhile, in the above-described embodiments, the example is illustrated in which the luminance evaluation value is calculated and displayed by the BPU 200 or the CCU 300. However, a configuration of calculating to display the luminance evaluation value with a camera is also conceivable. For example, in a case where the HDR camera process unit 104 is provided as the camera 100A of the camera system 10A in FIG. 6, the luminance evaluation value can be calculated to be displayed with the configuration as illustrated in FIG. 2.

Also, in the above-described embodiments, the example in which the optical-electro transfer function for HDR in the OETF unit 213 is used as the log curve characteristic for performing the gradation compression on the linear HDR video signal is described; however, a configuration may also be such that a log curve characteristic other than this is used. In this case, apart from the OETF unit 213, a compression unit for applying the gradation compression processing to the linear HDR video signal using the log curve characteristic is provided.

The present technology can also have the following configurations.

(1) An evaluation device provided with:
a processing unit which calculates a luminance evaluation value by processing a high dynamic range video signal; and
a control unit which displays the calculated luminance evaluation value on a display unit.

(2) The evaluation device according to (1) described above,
in which the processing unit calculates an average value of luminance for an entire screen as the luminance evaluation value using a linear high dynamic range video signal.

(3) The evaluation device according to (1) or (2) described above,
in which the processing unit calculates an average value of luminance for an entire screen as the luminance evaluation value using the high dynamic range video signal subjected to gradation compression processing.

(4) The evaluation device according to (3) described above,
in which the processing unit calculates the average value of the luminance for the entire screen as a ratio obtained by setting a code value corresponding to luminance of 100% as a reference value.

(5) The evaluation device according to (3) described above,
in which the processing unit calculates the average value of the luminance for the entire screen as a converted value to a luminance value before the compression processing is performed.

(6) The evaluation device according to any one of (1) to (5) described above,
in which the processing unit calculates a proportion of an area of a certain luminance level or higher in an entire screen as the luminance evaluation value using a linear high dynamic range video signal or the high dynamic range video signal subjected to gradation compression processing.

(7) The evaluation device according to any one of (1) to (6) described above,
in which the processing unit calculates an average value of luminance for an area of a certain luminance level or higher as the luminance evaluation value using a linear high dynamic range video signal.

(8) The evaluation device according to any one of (1) to (7) described above,
in which the processing unit calculates an average value of luminance for an area of a certain luminance level or higher as the luminance evaluation value using the high dynamic range video signal subjected to gradation compression processing.

(9) The evaluation device according to (8) described above,
in which the processing unit calculates the average value of the luminance for the area of the certain luminance level or higher as a ratio obtained by setting a code value corresponding to luminance of 100% as a reference value.

(10) The evaluation device according to (8) described above,
in which the processing unit calculates the average value of the luminance for the area of the certain luminance level or higher as a converted value to a luminance value before the compression processing is performed.

(11) The evaluation device according to any one of (1) to (10) described above,
in which the processing unit calculates a product value of a proportion of an area of a certain luminance level or higher in an entire screen and an average value of luminance for the area as the luminance evaluation value using a linear high dynamic range video signal.

(12) The evaluation device according to any one of (1) to (11) described above,
in which the processing unit calculates a product value of a proportion of an area of a certain luminance level or higher in an entire screen and an average value of luminance for the area as the luminance evaluation value using the high dynamic range video signal subjected to gradation compression processing.

(13) An evaluation method provided with:
a processing step of calculating a luminance evaluation value by processing a high dynamic range video signal by a processing unit; and
a control step of displaying the calculated luminance evaluation value on a display unit by a control unit.

(14) A camera system provided with:
an imaging unit which obtains a linear high dynamic range video signal;
a processing unit which calculates a luminance evaluation value by processing the linear high dynamic range video signal obtained by the imaging unit and/or a high dynamic range video signal obtained by applying gradation compression processing to the linear high dynamic range video signal; and
a control unit which displays the calculated luminance evaluation value on a display unit.

REFERENCE SIGNS LIST 10, 10A Camera system
100, 100A Camera
101 Imaging unit
102 Pre-process unit
103 Transmission unit
104 HDR camera process unit
200 Baseband processor unit (BPU)
201 Transmission unit
202 HDR camera process unit
203 SDR camera process unit
204 CPU
205 Matrix Y unit
206 Display
211 Linear matrix unit
212 Detail unit
213 OETF unit
214 RGB/Y chrominance conversion unit
300 Camera control unit (CCU)
301 Transmission unit
302 Inverse HDR camera process unit
303 SDR camera process unit
304 CPU
305 Matrix Y unit
306 Display

The invention claimed is:

1. An information processing apparatus, comprising:
circuitry configured to
generate an output video signal with a predetermined dynamic range, and generate a signal to display, based on a captured video signal generated by an image sensor, the generated signal including at least one luminance evaluation value calculated by processing the output video signal, wherein the circuitry is further configured to calculate, as the at least one luminance evaluation value, a first average value of luminance of all pixels in a frame of the output video signal, wherein the first average value of luminance is calculated as a ratio obtained by setting a code value corresponding to luminance of 100% as a reference value from the output video signal subjected to gradation compression processing; and
output the generated signal and the output video signal.

2. The information processing apparatus according to claim 1, wherein
the first average value of luminance is calculated as a converted value to a luminance value before the gradation compression processing is performed from the output video signal subjected to the gradation compression processing.

3. The information processing apparatus according to claim 1, wherein
the at least one luminance evaluation value includes a proportion of all pixels in the frame having luminance equal to a certain luminance level or higher.

4. The information processing apparatus according to claim 1, wherein
the at least one luminance evaluation value includes a second average value of luminance of those portions of the frame that have luminance equal to a certain luminance level or higher.

5. The information processing apparatus according to claim 4, wherein
the second average value is calculated as a ratio obtained by setting a code value corresponding to luminance of 100% as a reference value from the output video signal subjected to gradation compression processing.

6. The information processing apparatus according to claim 4, wherein
the second average value is calculated as a converted value to a luminance value before gradation compression processing is performed from the output video signal subjected to the gradation compression processing.

7. The information processing apparatus according to claim 5, wherein the at least one luminance evaluation value includes a product value of the proportion and the second average value of luminance.

8. The information processing apparatus according to claim 6, wherein the at least one luminance evaluation value includes a product value of the proportion and the second average value of luminance.

9. An information processing method, comprising:
generating, by circuitry, an output video signal with a predetermined dynamic range, and generating a signal to display, based on a captured video signal generated by an image sensor, the generated signal including at least one luminance evaluation value calculated by processing the output video signal, wherein the method includes calculating, as the at least one luminance evaluation value, one of (1) a first average value of luminance of all pixels in a frame of the output video signal, wherein the first average value of luminance is calculated as a ratio obtained by setting a code value corresponding to luminance of 100% as a reference value from the output video signal subjected to gradation compression processing; and outputting, by the circuitry, the generated signal and the output video signal.

10. The information processing method according to claim 9, wherein the first average value of luminance is calculated as a converted value to a luminance value before the gradation compression processing is performed from the output video signal subjected to the gradation compression processing.

11. The information processing method according to claim 9, wherein the at least one luminance evaluation value includes a proportion of all pixels in the frame having luminance equal to a certain luminance level or higher.

12. The information processing method according to claim 9, wherein the at least one luminance evaluation value includes a second average value of luminance of those portions of the frame that have luminance equal to a certain luminance level or higher.

13. The information processing method according to claim 12, wherein the second average value is calculated as a ratio obtained by setting a code value corresponding to luminance of 100% as a reference value from the output video signal subjected to gradation compression processing.

14. The information processing method according to claim 12, wherein the second average value is calculated as a converted value to a luminance value before gradation compression processing is performed from the output video signal subjected to the gradation compression processing.

15. A camera system, comprising:

an image sensor configured to generate a linear high dynamic range video signal; and circuitry configured to generate an output video signal with a predetermined dynamic range, and generate a signal to display, based on a captured video signal generated by the image sensor, the generated signal including at least one luminance evaluation value calculated by processing the output video signal, wherein the circuitry is further configured to calculate, as the at least one luminance evaluation value, a first average value of luminance of all pixels in a frame of the output video signal, wherein the first average value of luminance is calculated as a ratio obtained by setting a code value corresponding to luminance of 100% as a reference value from the output video signal subjected to gradation compression processing, and output the generated signal and the output video signal.

\* \* \* \* \*